United States Patent [19]

Kitabayashi et al.

[11] 4,306,165
[45] Dec. 15, 1981

[54] COOLING SYSTEM FOR ROTARY ELECTRIC MACHINES

[75] Inventors: Yukio Kitabayashi; Masatoshi Watanabe; Hironori Okuda; Noriyoshi Takahashi, all of Hitachi, Japan

[73] Assignee: Hitachi, Ltd., Tokyo, Japan

[21] Appl. No.: 58,626

[22] Filed: Jul. 18, 1979

[30] Foreign Application Priority Data

Jul. 28, 1978 [JP] Japan ................................ 53/91489

[51] Int. Cl.³ .............................................. H02K 9/00
[52] U.S. Cl. ........................................ 310/59; 310/61; 310/62; 310/269
[58] Field of Search ................... 310/60 R, 64, 61, 65, 310/58, 59, 52, 53, 269, 183, 62, 63, 258, 60 A

[56] References Cited

U.S. PATENT DOCUMENTS

| | | | |
|---|---|---|---|
| 1,030,041 | 6/1912 | Williamson | 310/183 |
| 2,899,573 | 8/1959 | Wesolowski | 310/269 |
| 3,106,654 | 10/1963 | Wesolowski | 310/61 |
| 3,514,647 | 5/1970 | Lipstein | 310/60 |
| 3,846,651 | 11/1974 | Mishra | 310/65 |
| 3,932,778 | 1/1976 | Watanabe | 310/61 |
| 4,182,966 | 1/1980 | Mishra | 310/269 |

FOREIGN PATENT DOCUMENTS

| | | | |
|---|---|---|---|
| 2605815 | 8/1977 | Fed. Rep. of Germany | 310/269 |
| 82902 | of 1976 | Japan | 310/61 |

*Primary Examiner*—R. Skudy
*Attorney, Agent, or Firm*—Craig and Antonelli

[57] ABSTRACT

A cooling system for a rotary electric machine having a stator including a stator core and a stator frame for supporting the stator core and a rotor including a yoke, a plurality of salient magnetic poles mounted on the periphery of the yoke and shield plates bridging the tips of the adjacent magnetic poles wherein the cooling system comprises groups of air-discharging and air-charging ducts radially penetrating the stator core, each group of the ducts being axially aligned with a predetermined distance from each other and air-discharging windows formed in the shield plates at predetermined axial positions thereof, and the axial area of each group of the air-discharging ducts is larger than the axial area of the air-discharging window of the corresponding shield plate thereby increasing the flow rate of the cooling air through the rotary machine.

4 Claims, 9 Drawing Figures

COOLING SYSTEM FOR ROTARY ELECTRIC MACHINES

BACKGROUND OF THE INVENTION

The present invention relates to an improvement of a cooling system for rotary electric machines with salient magnetic poles such as water-wheel generators. More particularly, the invention relates to an improvement of an air cooling system for rotary electric machines with shield plates each bridging the tips of adjacent magnetic poles in which the cooling air flowing in a space formed between the adjacent magnetic poles is discharged through an air-discharge window of the shield plate and air discharge ducts formed radially in the stator core to the outside of the stator frame.

There have been many proposals of cooling systems for rotary electric machines of medium size and some of them have been brought into practice. In the field of the rotary electric machines, a recent trend is to increase the capacity of a single machine, which necessarily requires a larger amount of cooling air flowing through the machine. This, however, gives rise to the windage loss problem in the cooling air flow. Some solutions of the problem are disclosed in, for example, U.S. Pat. No. 3,514,647 issued May 26, 1970 to Norman J. Lipstein, entitled "Cooling Arrangement For Dynamoelectric Machines", U.S. Pat. No. 3,106,654 issued Oct. 8, 1963 to Adolph J. Wesolowski, entitled "Salient Pole For Synchronous Machines" and Japanese utility model application Ser. No. 2690/75, laid-open as laid-open No. 82902/76 and entitled "Salient Pole Rotor". In those solutions, shield plates are provided to bridge the tips of every adjacent magnetic poles so that the rotor gives a substantially cylindrical configuration, thereby to lower the windage loss on the outer surface of the rotor. The construction of the rotary electric machine thus designed and the flows of the cooling air within the machine will be described referring to FIGS. 1 and 2. In the figures, reference numeral 1 designates a shaft; 2 a yoke mounted to the shaft 1; 4 salient magnetic poles; 5 a field coil; 6 a shield plate closing a space between the adjacent salient magnetic poles to lower the windage loss on the outer surface of the rotor.

In the stator, a stator winding 7 is wound around a stator core 8, fitting in the slots of the core 8. Reference numeral 9 is a duct permitting cooling air flow therethrough to cool the core 8 and numeral 10 designates a stator frame including a plurality of partition plates 10a. Numerals 11 and 12 represent first air flow guides for introducing cooling air into the rotary electric machine. Numerals 13 and 14 represent second air flow guides for providing an air path for the cooling air which is effective, in cooperation with the fan action by the salient poles, to decrease the amount of cooling air flowing back toward the spaces between the adjacent magnetic poles. Numerals 15 and 16 indicate first blowers for forcibly feeding cooling air through the spaces between the magnetic poles to cool the field winding 5 and the iron core. Box-shaped air collectors 17 and 19 well illustrated in FIG. 2 collect air flowing into and from the rear side of the stator core 8. A cooler 18 is mounted on the air collector 17. A second blower 20 for cooling the stator is similarly mounted on the air collector 19. A foundation of concrete designated by reference numeral 21 supports the rotary electric machine.

The cooling air within the rotary electric machine thus constructed flows as follows. For cooling the field winding 5, both the first blowers 15 and 16 feed cooling air into the space between the adjacent magnetic poles 4. The cooling air, then, flows through an window 50 opened at the axially central part of the shield plate 6 bridging the space between the adjacent magnetic poles 4 and a part of air-discharge ducts 9a located at the axial center portion of the stator core and having substantially the same axial size as the window 50 into the cooler 18. For cooling the stator, the second blower 20 blows cooling air into the rear side of the stator. The cooling air passes through inflow sections 22 and the ducts 9 to flow out through an air gap g. The cooling air guided into the gap g is bent to flow into air discharge ducts 9a. The cooling air, then, passes through the outflow section 23 towards the cooler 18.

This type rotary electric machine thus constructed and cooled suffers from the following shortcomings which will be described with reference to FIG. 3. A cooling air flow a discharged through a portion not covered by the shield plate 6, i.e. the window 50, toward the air gap g interferes with an air flow in the stator side, resulting in reducing the amounts of air flows of the stator and rotor sides. That is, the fan action of the salient magnetic poles causes the air flow a to blow at a high pressure into the air gap g and the stator side. In this case, the air flow a flows in a direction the same as the flow b in the outflow section 23 but opposite to the flow c in the inflow section 22. Accordingly, the amount of cooling air flow d from the rear side of the stator to the air gap g is considerably reduced. Further, the cooling air flows through the ducts which are located near the boundary between the outflow section and the inflow section decreases greatly because it is against the cooling air flow a from the rotor. The failure of cooling air flow may cause a high temperature rise at the area resulting in the coil being damaged due to local heating.

The air flow a from the rotor side interferes with the air flow in the stator side thereby increasing the air-flow resistance so that the amount of air flow in the rotor side also reduces greatly.

SUMMARY OF THE INVENTION

Accordingly, an object of the invention is to provide a cooling system for rotary electric machine capable of preventing the amount of air flow from reducing due to the interference between cooling air flows thereby protecting the coil from local over heating.

To achieve the above object, the axial area of a group of ducts formed in the stator core is made larger than that of the window formed in the shield plate bridging the adjacent magnetic poles thereby to reduce the interference between the cooling air from the stator side and the cooling air flow from the rotor side.

Other objects and features of the invention will be apparent from the following description taken in connection with the accompanying drawing, in which:

DESCRIPTION OF THE PREFERRED EMBODIMENTS

Figure 2:
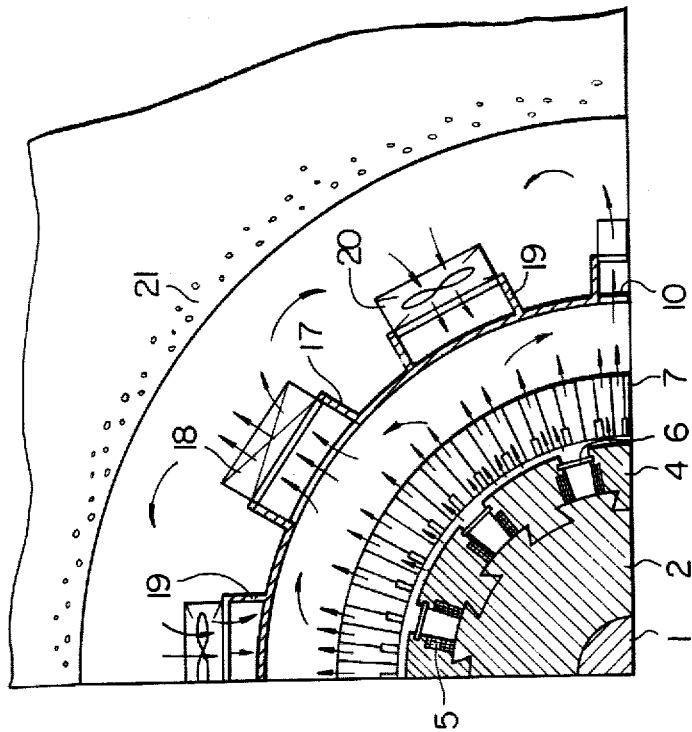
FIG. 2 shows a cross sectional view of the rotary electric machine taken along line II—II shown in FIG. 1.
Figure 1:
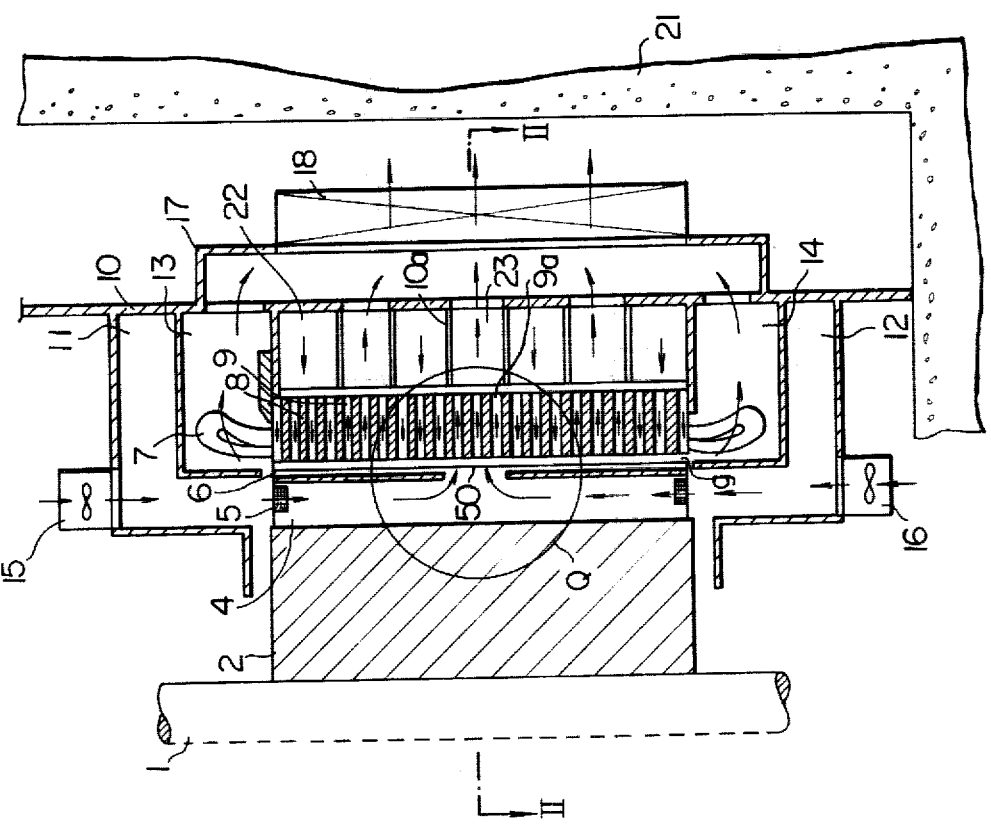
FIG. 1 shows a longitudinal sectional view of a salient-pole rotary electric machine having a conventional cooling system.
Figure 3:
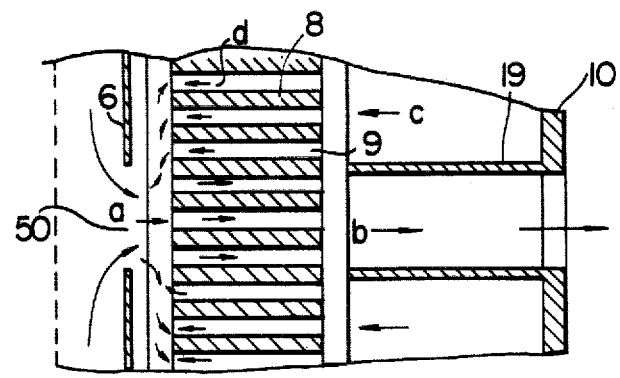
FIG. 3 shows an enlarged cross sectional view of an encircled portion Q shown in FIG. 1.
Figure 4:
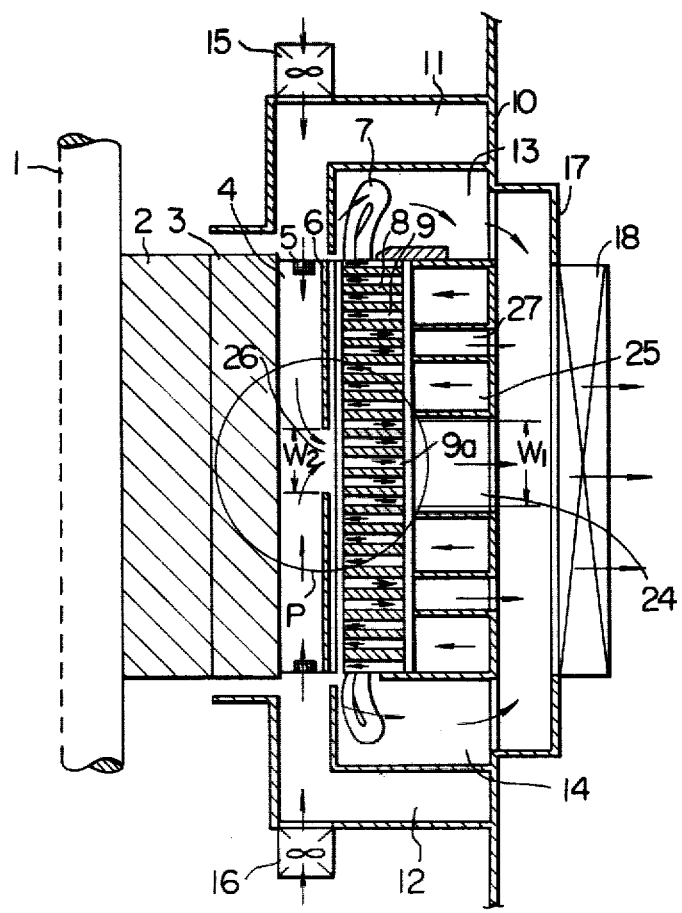
FIG. 4 shows a partial longitudinal sectional view of a salient-pole rotary electric machine having a cooling system according to the invention.
Figure 5:
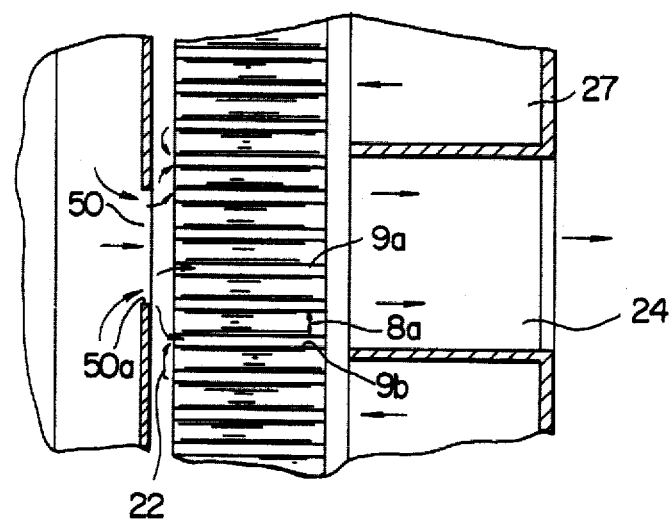
FIG. 5 shows an enlarged cross sectional view of an encircled portion P shown in FIG. 4.

Now, the invention will be explained referring to the drawings wherein like reference characters are used to designate like or corresponding parts through out the several views. There is shown in FIG. 4 a longitudinal sectional view of a rotary electric machine with a cooling system of the invention. As shown, the axial cross-section of the area $W_1$ where there are formed a group of stator air-discharge ducts 9a facing the air discharge window 50 of the rotor, is formed to be larger than the axial area $W_2$ of the window. If the total axial thickness of the laminated core portions of the stator is equal to that of the conventional electric machine, the axial areas for the remaining groups of air-discharge ducts 27 and air-charging ducts 25 are formed to be relatively shorter than those of the conventional machine. Note here that the axial area for the group of air-discharge ducts 9a must be longer at least by the thickness, for example about 50 mm, of the laminated core portions existing in the area. As shown in FIG. 5 illustrating the air-discharge ducts and the related portion in an enlarged manner, each axial end 9b of the group of the air-discharge ducts 9a is separated from the corresponding axial end of the air-discharge window 50 by a distance not less than the core thickness 8a between the adjacent ducts. With this arrangement, most of the cooling air discharged from the window 50 passes through the ducts 9a located at the axial center portion. Some cooling air flowing through the ducts located at both end areas of the duct group may interfere with the cooling air 22 from the stator side. In this case, however, the end area where the interference may take place is apart from the window 50, the air flow from rotor side develops a low air pressure at the area so that the stator side air flow prevails over the rotor side air flow. Further, since the air interference takes place at the enlarged area for the air-exhaust ducts. The air-exhaust ducts 9a facing the window 50 can provide a sufficient path for the cooling air flow and therefore the reduction of the amount of air flow due to the air interference may be prevented.

Figure 6:
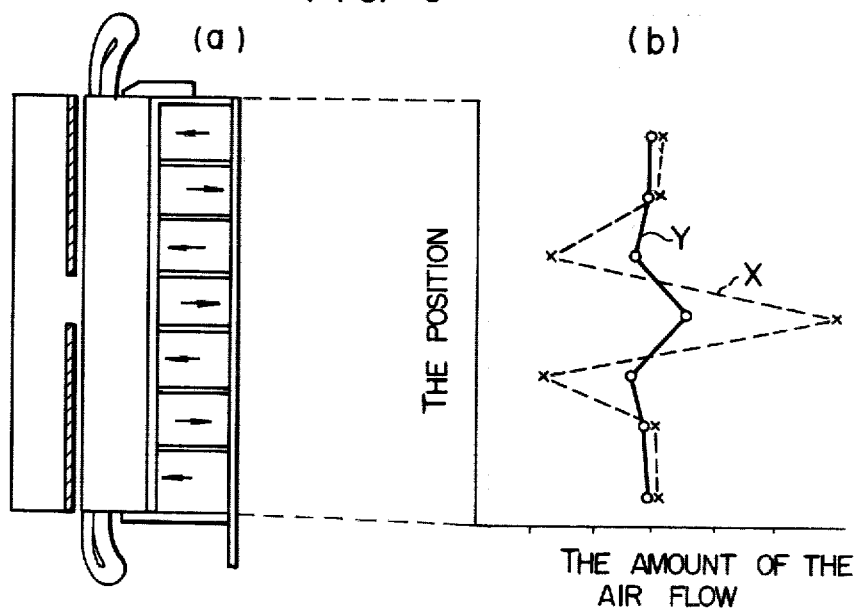
FIG. 6 shows a graph illustrating a variation of an amount of the air flow with respect to positions in the stator.

Reference is made to FIG. 6 for comparing the cooling system according to the invention with the conventional one. The graph shown in FIG. 6(b) illustrates the air flow distributions at various axial positions on the rear side of the stator as shown in FIG. 6(a) when provided with the cooling system of the invention and with the conventional one, respectively. For depicting the graph, rotary electric machines used for the tests are of about 300 MVA and made of an iron core having about 4500 mm in thickness and about 6000 mm in outer diameter. In the graph, a curve X indicated by a dotted line indicates the distribution of the air flow in the conventional cooling system. As seen from the graph, the amount of the cooling air flowing into a portion facing the window is very large but the amount of the air flow from the stator side through the sections adjacent to both ends of the window facing air duct group is very small. On the other hand, the distribution of the air flow according to the invention is considerably improved. As seen from a curve Y indicated by a solid line in FIG. 6(b) the amounts of the air flow at the axial ends of the core are substantially equal to those of the conventional machine, and the amount of air flow is considerably reduced at the central portion while greatly increased at adjacent portions to the central portion. Thus, the distribution of the air flow is uniform over the entire axial length on the stator rear side.

Figure 7:
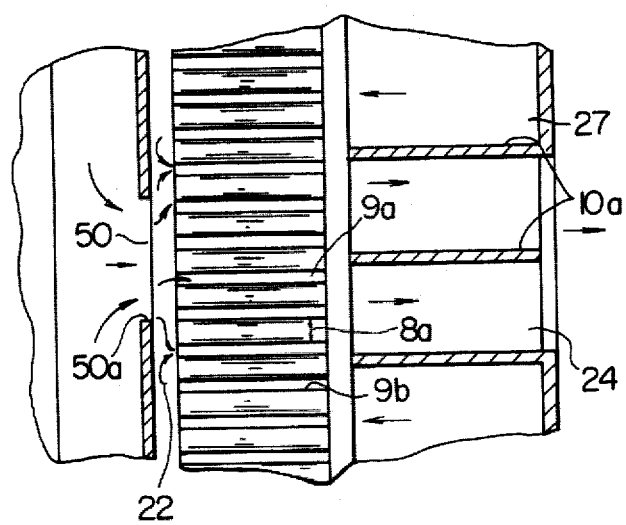
FIG. 7 shows a cross sectional view of another embodiment of the invention.

In the embodiment mentioned above, both ends of the axial area of each group of the air-discharge ducts are substantially aligned with the partition plates of the stator frame defining the corrresponding section. However, a plurality of partitioning plates 10a may be formed within the section 24 corresponding to the axial area of the ducts 9a, as shown in FIG. 7. Such additional partitioning plates are effective to strengthen the stator frame and to reform the cooling air flow.

Figure 8:
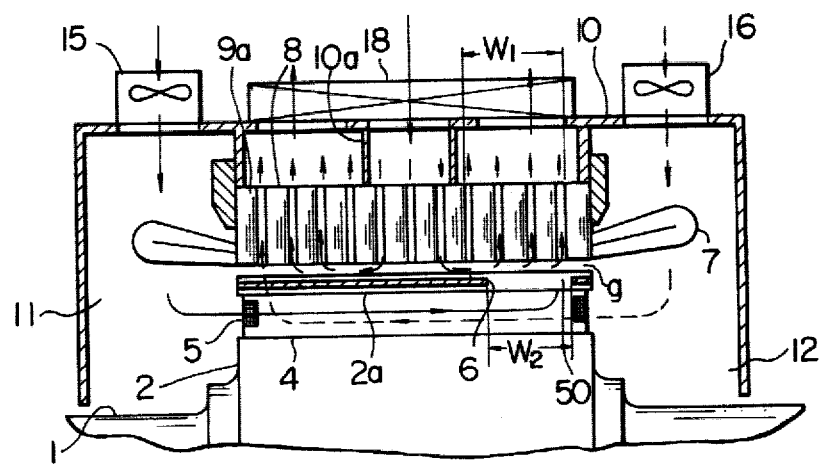
FIG. 8 shows a longitudinal sectional view of the rotary electric machine provided with another embodiment according to the invention.

Further, the air-exhaust window, which is located at the axial central portion in the embodiment mentioned above may also be located at a position displaced from the axial central portion. This is realized in an embodiment shown in FIG. 8. In the embodiment, the cooling air flow in the inflow section is slightly different from that in the above-mentioned embodiment. But there is no substantial differences in other points such that the axial area $W_1$ of the stator duct group 9a is larger than the axial area $W_2$ of the window 50, and that the air discharged through the window 50 passes through the stator duct group 9a to the outside of the stator frame 10.

Figure 9:
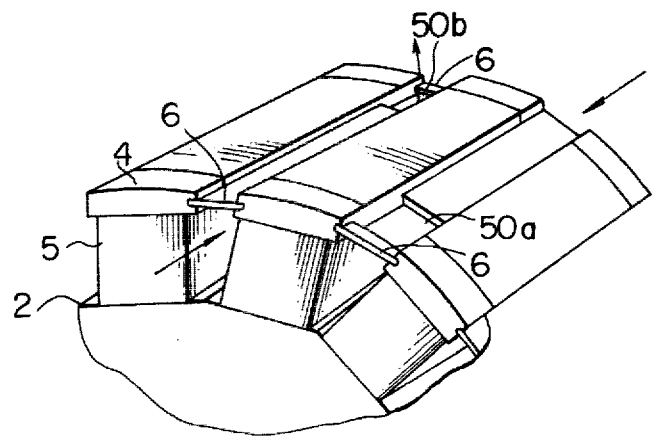
FIG. 9 shows a perspective view of a major part of the rotor of the embodiment shown in FIG. 8.

In the case of the embodiment where the window 50 is axially displaced, it is difficult to make the distribution of the cooling air uniform in each space between the adjacent salient poles. Therefore, it is preferred to dispose the windows of the shield plates at one and the other of the opposite sides thereof, alternately, as shown in FIG. 9, wherein the alternately arranged windows are denoted as 50a and 50b.

As described above, in the cooling system according to the invention, the axial area of the stator core air-discharge ducts facing the window of the rotor is larger than that of the window. Accordingly, the interference between the cooling air discharged from the rotor side and the cooling air from the stator side is greatly reduced, thereby to prevent the amount of the air flow in the vicinity of the window from being reduced.

What is claimed is:

1. In a cooling system for a rotary electric machine having a rotor with a plurality of circumferentially spaced salient magnetic poles radially projecting from a periphery of a yoke with intermediate spaces defined between adjacent salient magnetic poles, a plurality of shield plate means each respectively bridging tips of adjacent salient magnetic poles to close said intermediate spaces, a window means in each of the shield plate means for radially discharging cooling air so as to enable the cooling air to flow from the intermediate spaces toward an outside thereof, a first blower means adapted to be mounted on the rotary electric machine for producing cooling air to cool the salient magnetic poles, a stator having a stator iron core including a plurality of charge and discharge duct groups axially arranged and radially extending through the stator core, and a stator frame for supporting the stator core, the stator frame including axially extending partitioning plates for defining air charge and discharge sections in communication with the charge and discharge duct groups at an outer periphery of the stator core, and a second blower means adapted to be mounted on the rotary electric machine for feeding cooling air into the air change duct groups of the stator, and means for guiding the cooling air of the first blower means into the intermediate spaces, through the window means of the respective shield plate means, through the discharge duct groups of the stator core and discharge sections of the stator frame toward an outside of the stator, and for guiding the cooling air of the second blower through the air charge sections of the stator frame, to the air-charge duct group of the stator core, and towards an outer side of the shield plate means where cooling air from the first blower means is joined with cooling air of the second blower means, the improvement in which an axial area of the discharge duct group of the stator core is larger than an axial area of the respective shield plate means.

2. In a cooling system for a rotary electric machine having a rotor with a plurality of circumferentially spaced salient magnetic poles radially projecting from a periphery of a yoke with intermediate spaces defined between adjacent salient magnetic poles, means each respectively bridging tips of adjacent salient magnetic poles to close said intermediate spaces, a window means formed at respective centers in the axial length of the shield plate means, a first blower means adapted to be mounted on the rotary electric machine for producing cooling air to cool the salient magnetic poles, a stator having a stator iron core including a plurality of charge and discharge duct groups axially arranged and radially extending through the stator core, and a stator frame for supporting the stator core, the stator frame including axially extending partitioning plates for defining air charge and discharge sections in communication with the charge and discharge duct groups at an outer periphery of the stator core, and a second blower means adapted to be mounted on the rotary electric machine for feeding cooling air into the air charge duct groups of the stator, and means for guiding the cooling air of the first blower means into the intermediate spaces, through the window means of the respective shield plate means, through the discharge duct groups of the stator core and discharge sections of the stator frame toward an outside of the stator, and for guiding the cooling air of the second blower through the air charge sections of the stator frame, to the air-charge duct group of the stator core, and towards an outer side of the shield means where cooling air from the first blower means is joined with cooling air of the second blower means, the improvement in which an axial area of the discharge duct group of the stator core is larger than an axial area of the window means of the respective shield plate means.

3. A cooling system according to claim 2, wherein a plurality of the partitioning plates are arranged within the air-discharge duct group.

4. In a cooling system for a rotaray electric machine having a rotor with a plurality of circumferentially spaced salient magnetic poles radially projecting from a periphery of a yoke with intermediate spaces defined between adjacent salient magnetic poles, a plurality of shield plate means each respectively bridging tips of adjacent salient magnetic poles to close said intermediate spaces, a window means in each of the shield plate means for radially discharging cooling air so as to enable the cooling air to flow from the intermediate spaces toward an outside thereof, a first blower means adapted to be mounted on the rotary electric machine for producing cooling air to cool the salient magnetic poles, a stator having a stator iron core including a plurality of charge and discharge duct groups axially arranged and radially extending through the stator core, and a stator frame for supporting the stator core, the stator frame including axially extending partitioning plates for defining air charge and discharge sections in communication with the charge and discharge duct groups at an outer periphery of the stator core, and a second blower means adapted to be mounted on the rotary electric machine for feeding the cooling air into the air charge duct groups of the stator, and means for guiding the cooling air of the first blower means into the intermediate spaces, through the window means of the respective shield plate means, through the discharge duct groups of the stator core and discharge sections of the stator frame toward an outside of the stator, and for guiding the cooling air of the second blower through the air charge sections of the stator frame, to the air-charge duct group of the stator core, and towards an outer side of the shield plate means where cooling air from the first blower means is joined with cooling air of the second blower means, the improvement in which the window means are each located at one axial ends of the shield plate means, the window means of the adjacent shield plate means are located at the opposite axial ends of the shield plates, and an axial area of the discharge duct group of the stator core is larger than an axial area of the window means of the respective shield plate means.

* * * * *